(12) United States Patent
Umali

(10) Patent No.: US 7,997,188 B2
(45) Date of Patent: Aug. 16, 2011

(54) PORTABLE MULTIPURPOSE COOKING UTENSIL

(76) Inventor: Ignacio R. Umali, Covina, CA (US)

( * ) Notice: Subject to any disclaimer, the term of this patent is extended or adjusted under 35 U.S.C. 154(b) by 422 days.

(21) Appl. No.: 11/850,711

(22) Filed: Sep. 6, 2007

(65) Prior Publication Data

US 2008/0060529 A1    Mar. 13, 2008

Related U.S. Application Data

(60) Provisional application No. 60/842,911, filed on Sep. 7, 2006.

(51) Int. Cl.
*A47J 37/00* (2006.01)

(52) U.S. Cl. .............................. 99/339; 99/340

(58) Field of Classification Search .................... 99/339, 99/340, 341, 342, 426; 220/573.1, 573.2; 126/369.2, 369; *A47J 36/20, 36/00, 37/10, A47J 36/06*
See application file for complete search history.

(56) References Cited

U.S. PATENT DOCUMENTS

| | | | |
|---|---|---|---|
| 509,543 A * | 11/1893 | Metzler et al. ............. | 126/369.2 |
| 1,263,004 A * | 4/1918 | Tillagsen ...................... | 126/369 |
| 1,462,275 A * | 7/1923 | Gammel ...................... | 126/369 |
| 1,711,631 A * | 5/1929 | Burnett ........................ | 126/369 |
| 3,212,426 A * | 10/1965 | Lewus ......................... | 126/369 |
| 3,301,172 A * | 1/1967 | Longo .......................... | 99/446 |
| 3,701,344 A * | 10/1972 | Walls et al. ................. | 126/388.1 |
| 4,320,736 A * | 3/1982 | Sharon ....................... | 126/19 M |
| 4,650,968 A * | 3/1987 | Williams ................... | 126/369.2 |
| 5,057,331 A * | 10/1991 | Levinson ..................... | 426/243 |
| 5,094,865 A * | 3/1992 | Levinson ..................... | 426/243 |
| 5,235,904 A * | 8/1993 | Ludena ....................... | 126/369 |
| 5,365,833 A * | 11/1994 | Chen .............................. | 99/447 |
| 5,380,986 A * | 1/1995 | Mullen ......................... | 219/472 |
| 5,555,994 A * | 9/1996 | Chen ............................ | 126/369 |
| 5,682,873 A * | 11/1997 | Chambers ................. | 126/275 R |
| 5,724,885 A * | 3/1998 | Uy ................................ | 99/341 |
| 5,782,165 A * | 7/1998 | Glenboski et al. ............. | 99/340 |
| 6,089,145 A * | 7/2000 | Watson ......................... | 99/339 |
| 6,320,166 B1 * | 11/2001 | Park ............................ | 219/439 |
| 6,323,464 B1 * | 11/2001 | Cohn ............................ | 219/401 |
| 6,698,964 B2 * | 3/2004 | DaSilveira ................... | 403/218 |
| 7,028,684 B2 * | 4/2006 | Johnson ..................... | 126/41 R |
| 7,238,921 B2 * | 7/2007 | Beesley et al. ................. | 219/386 |
| 2003/0209551 A1 * | 11/2003 | Park ........................... | 220/573.1 |
| 2004/0211406 A1 * | 10/2004 | Cornfield ..................... | 126/274 |
| 2005/0132897 A1 * | 6/2005 | Umali ............................ | 99/339 |

* cited by examiner

*Primary Examiner* — Geoffrey S Evans

(74) *Attorney, Agent, or Firm* — Kenneth L Tolar

(57) ABSTRACT

A portable, multipurpose cooking utensil includes a base pan adapted to retain a grill having a dome-shaped, transparent lid thereon. The device also includes a heat control unit that allows a user to select the amount heat delivered to the grill. The heat control unit may be replaced with a broiling pan or frying pan, if desired.

13 Claims, 3 Drawing Sheets

PORTABLE MULTIPURPOSE COOKING UTENSIL

CROSS REFERENCE TO RELATED APPLICATIONS

This application is entitled to the benefit of provisional application No. 60/842,911 filed on Sep. 7, 2006, the specification of which is incorporated herein by reference.

BACKGROUND OF THE INVENTION

The present invention relates to a portable cooking utensil having interchangeable components that allow it to be converted to a grill, broiler, poacher or simmering pan.

DESCRIPTION OF THE PRIOR ART

Evenly distributing heat around a food item usually results in faster, more efficient cooking. Various convection ovens and grills have been heretofore designed that purportedly circulate heat around the periphery of a food item. However, such appliances are large, stationary and have limited versatility. Accordingly, there is currently a need for a convection type cooking utensil that is portable and versatile. The present invention addresses this need by providing a uniquely designed utensil having numerous interchangeable components that allow it to be converted to a roaster, a simmering pan, a broiler or a grill.

SUMMARY OF THE INVENTION

The present invention relates to a portable, multipurpose cooking utensil including a base pan adapted to retain a grill having a dome-shaped, transparent lid superimposed thereon. The device also includes a heat control unit that allows a user to select the amount heat delivered to the grill. The heat control unit may be replaced with a broiling pan, a simmering pan and/or a frying pan, if desired.

It is therefore an object of the present invention to provide a multi-purpose cooker that directs heat from an external source about the periphery of a food item.

It is another object of the present invention to provide a multi-purpose cooker that can be interchangeably converted to a roaster, a broiler, a fryer and grill.

It is yet another object of the present invention to provide a multipurpose cooker that can be used with any available energy source such as charcoal, firewood, gas or electricity.

Other objects, features, and advantages of the present invention will become readily apparent from the following detailed description of the preferred embodiment when considered with the attached drawings and the appended claims.

DESCRIPTION OF THE PREFERRED EMBODIMENT

Figure 1:
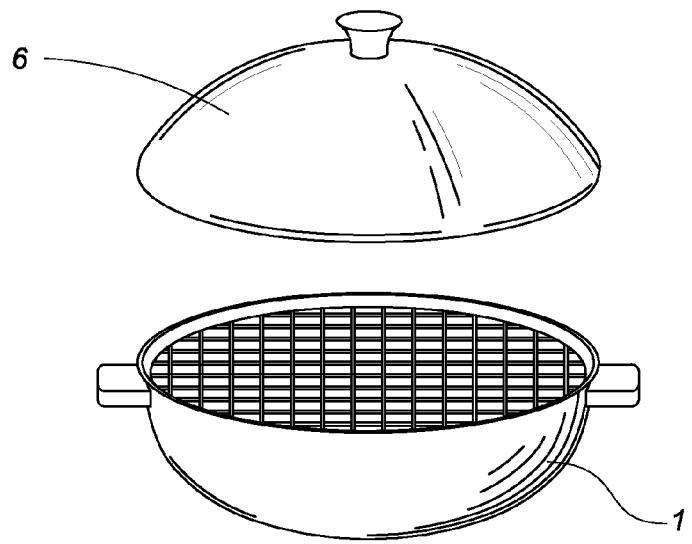
FIG. 1 is a perspective view of the base pan and accompanying lid.
Figure 2:
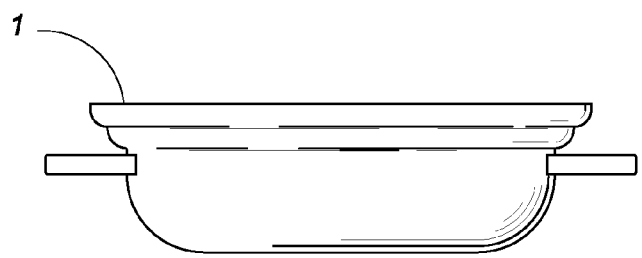
FIG. 2 is a side view of the base pan.
Figure 3:
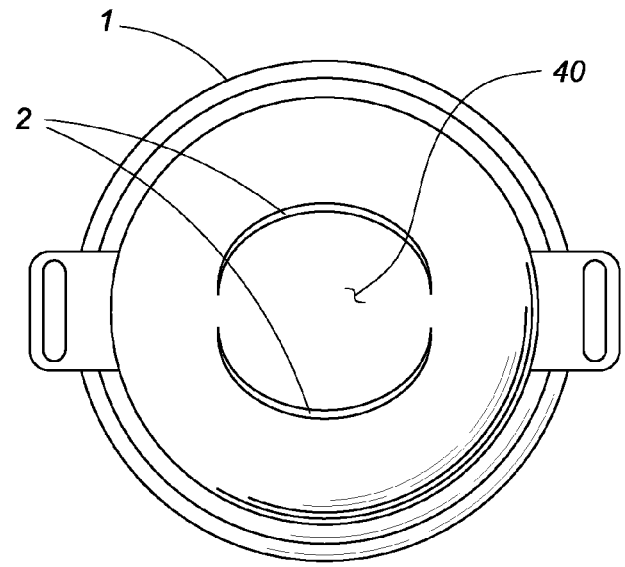
FIG. 3 is a top view of the base pan.
Figure 4:
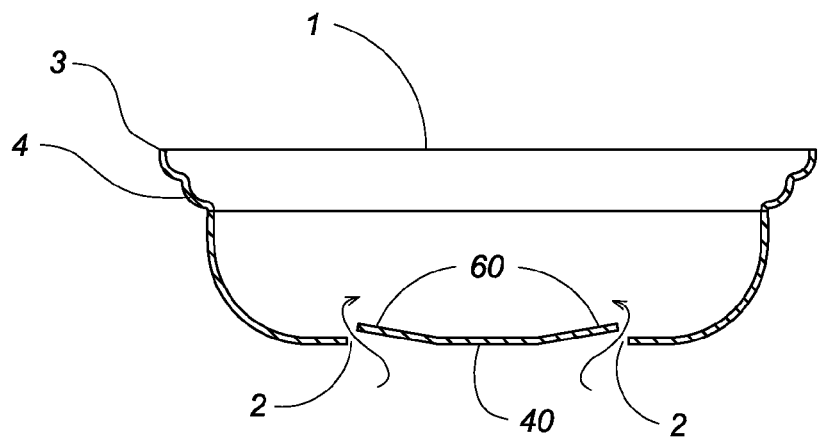
FIG. 4 is a front, cross-sectional view of the base pan.
Figure 5:
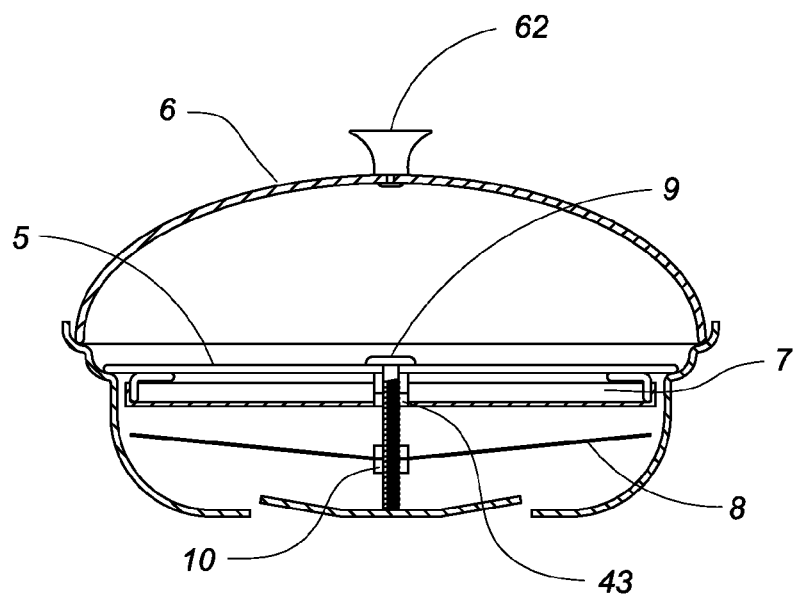
FIG. 5 is a cross-sectional view of the device being used as a grill or dry cooker.
Figure 6:
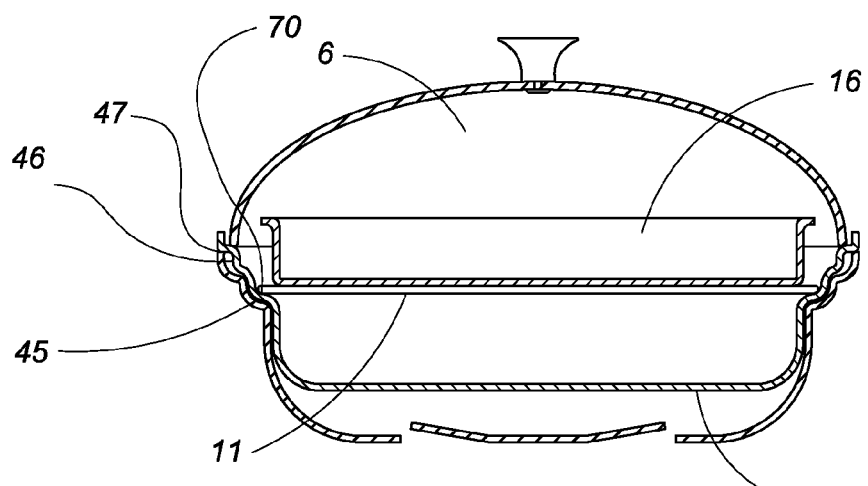
FIG. 6 is a side, cross-sectional view of the device being used as a poacher or broiler.
Figure 7:
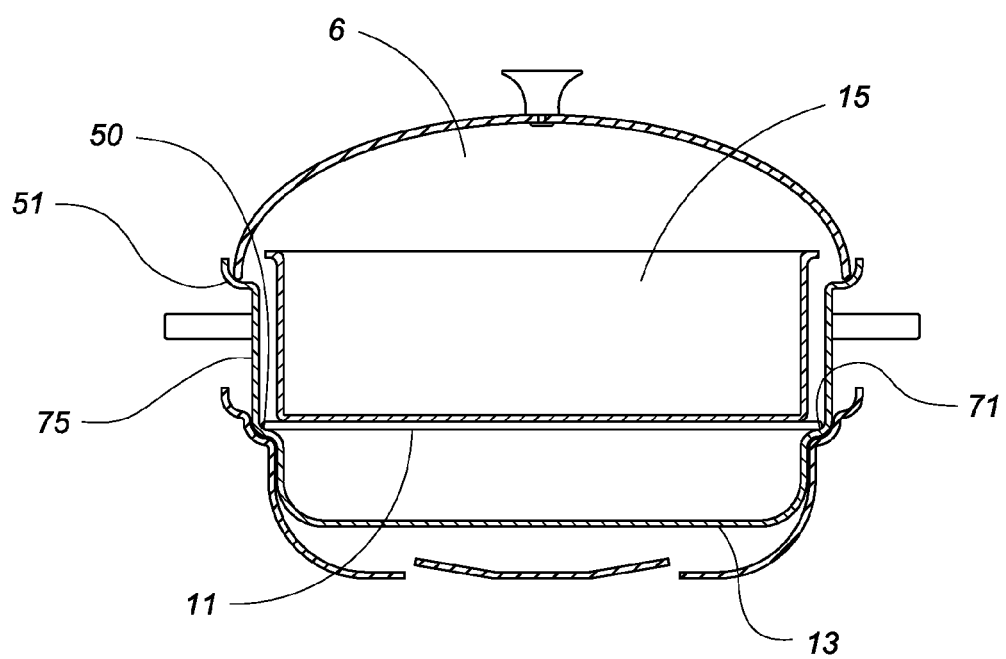
FIG. 7 is a side, cross-sectional view of the device being used as a deep broiler for larger meats or soups.

The present invention relates to a cooking utensil. The device comprises a base pan 1 having a lower surface, a continuous outer wall and an open top. The lower surface includes a pair of crescent-shaped vents 2 formed thereon for providing ambient air and heat to the base pan interior. The vents are formed by a circular baffle 40 having two upturned sections 60 that more efficiently direct heat into the base pan interior.

Around the interior of the outer wall of the base pan, adjacent the open top, are upper 3 and lower 4 annular grooves. The lower groove 4 supports a cooking grill 5 while the upper groove supports a dome-shaped glass cover 6. The cover includes a heat-resistant knob 62 on an upper portion thereof allowing the hot cover to be removed without pot holders or other protective articles. The cooking grill is part of a temperature control unit and is superimposed on a drip pan 7 having a heat shield 8 disposed below. A threaded bolt 9 extends through the cooking grill 5, a threaded bore 43 formed through the drip pan 7 and a threaded nut 10 on the heat shield. Accordingly, the height of the heat shield and drip pan can be varied to adjust the heat intensity directed toward the cooking grill.

The above described design allows the device to be used as a dry cooker for grilling, boiling, baking and barbecuing. The food item is simply placed on the cooking grill and the glass cover is superimposed on the base pan. The base pan is placed on a conventional, auxiliary heat source such as a stove burner whereby the cover will direct heat generated thereby about the food item periphery.

The device may be converted to a broiler or fryer by removing the heat control unit, i.e., the cooking grill, the drip pan and the heat shield. A frying pan 12 or simmering pan 13 is positioned within the base pan depending upon the application. The frying pan 12 includes an upwardly-stepped interior surface having a first rim 45 that rests on the lower groove 4 and a second rim 46 that rests on the upper groove 3. A third, uppermost rim 47 receives the outer periphery of the cover. The stepped interior surface of the frying pan forms a ledge 70 that supports a heating grill 11; a low-profile broiling pan 16 is placed onto the heating grill for poaching, steaming and broiling a desired food item.

The simmering pan 13 includes a first rim 50 that seats on the lower groove 4 and an upper rim 51 for supporting the cover with a high-profile intermediate portion 75 therebetween. The additional space created by the high-profile intermediate portion allows the simmering pan to accommodate a high-profile broiling pan 15, which may be used for soups, larger cuts of meat, etc. As with the frying pan, the simmering pan includes an interior ledge 71 that suspends the heating grill 11.

The above described device is not limited to the exact details of construction and enumeration of parts provided herein. Furthermore, the size, shape and materials of construction of the various components can be varied.

Although there has been shown and described the preferred embodiment of the present invention, it will be readily apparent to those skilled in the art that modifications may be made thereto which do not exceed the scope of the appended claims. Therefore, the scope of the invention is only to be limited by the following claims.

What is claimed is:

1. A portable multipurpose cooking utensil comprising:
a base pan having a lower surface, a continuous outer wall, an interior cooking chamber and an open top, said outer wall having an interior surface;
an upper continuous groove formed on the interior surface of said outer wall;
a lower continuous groove formed on the interior surface of said outer wall;
a grill received within the lower groove;
a cover received within the upper groove;
at least one vent on the lower surface of said base pan for providing heat from an auxiliary heat source to the cooking chamber whereby said base pan is placed on said heat source allowing items to be cooked on said grill;
means for controlling a temperature within said cooking chamber;
wherein said means for controlling a temperature within said cooking chamber comprises:
a drip pan positioned beneath said grill;
a heat shield positioned beneath said drip pan and above said vent;
means for selectively varying a height of said heat shield.

2. The portable multipurpose cooking utensil according to claim 1 further comprising means for varying a height of said drip pan.

3. The portable multipurpose cooking utensil according to claim 2 wherein said means for selectively varying a height of said heat shield and said means for varying a height of said drip pan comprises a threaded bolt extending through said grill, said drip pan and a threaded bore formed within the heat shield whereby rotation of said bolt effects vertical movement of said heat shield.

4. The portable multipurpose cooking utensil according to claim 3 further comprising a baffle positioned above said vent, said baffle having two upturned sections that more efficiently direct heat from said auxiliary source into the cooking chamber.

5. The portable multipurpose cooking utensil according to claim 4 wherein said cover includes a heat-resistant knob on an upper portion thereof allowing the cover to be removed without protective articles.

6. The portable multipurpose cooking utensil according to claim 5 further comprising a frying pan received within said base pan, said frying pan including an upwardly-stepped interior surface having a first rim that seats on the lower groove within the base pan, a second rim that rests on the upper groove within the base pan, a third uppermost rim that receives an outer periphery of the cover and an interior ledge that supports said grill;
a low-profile broiling pan positioned on said grill.

7. The portable multipurpose cooking utensil according to claim 6 wherein said cover is transparent.

8. The portable multipurpose cooking utensil according to claim 5 further comprising a simmering pan received within said base pan, said simmering pan including a first rim that rests on the lower groove within the base pan, an upper rim that supports said cover, a high-profile intermediate portion therebetween and an interior ledge that supports said grill;
a high-profile broiling pan positioned on said grill.

9. A portable multipurpose cooking utensil comprising:
a base pan having a lower surface, a continuous outer wall, an interior cooking chamber and an open top, said outer wall having an interior surface;
an upper continuous groove formed on the interior surface of said outer wall;
a lower continuous groove formed on the interior surface of said outer wall;
a grill received within the lower groove;
a cover received within the upper groove;
at least one vent on the lower surface of said base pan for providing heat from an auxiliary heat source to the cooking chamber whereby said base pan is placed on said heat source allowing items to be cooked on said grill;
a frying pan received within said base pan, said frying pan including an upwardly-stepped interior surface having a first rim that seats on the lower groove within the base pan, a second rim that rests on the upper groove within the base pan, a third uppermost rim that receives an outer periphery of the cover and an interior ledge that supports said grill;
a low-profile broiling pan positioned on said grill.

10. The portable multipurpose cooking utensil according to claim 9 further comprising a baffle positioned above said vent, said baffle having two upturned sections that more efficiently direct heat from said auxiliary source into the cooking chamber.

11. The portable multipurpose cooking utensil according to claim 10 wherein said cover includes a heat-resistant knob on an upper portion thereof allowing the cover to be removed without protective articles.

12. A multipurpose cooking utensil comprising: a base pan having a lower surface, a continuous outer wall, an interior cooking chamber and an open top, said outer wall having an interior surface;
an upper continuous groove formed on the interior surface of said outer wall;
a lower continuous groove formed on the interior surface of said outer wall;
a grill received within the lower groove;
a cover received within the upper groove;
at least one vent on the lower surface of said base pan for providing heat from an auxiliary heat source to the cooking chamber whereby said base pan is placed on said heat source allowing items to be cooked on said grill;
a simmering pan received within said base pan, said simmering pan including a first rim that rests on the lower groove within the base pan, an upper rim that supports said cover, a high-profile intermediate portion therebetween and an interior ledge that supports said grill;
a high-profile broiling pan positioned on said grill.

13. The portable multipurpose cooking utensil according to claim 12 further comprising a baffle positioned above said vent, said baffle having two upturned sections that more efficiently direct heat from said auxiliary source into the cooking chamber.

* * * * *